UNITED STATES PATENT OFFICE.

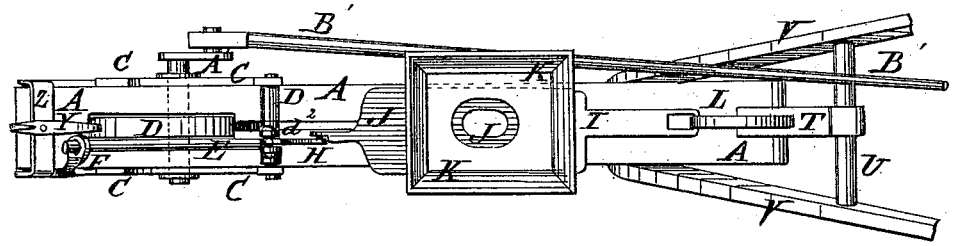

HENRY S. O'NEAL, OF CONCORD, TENNESSEE.

IMPROVEMENT IN SEED-PLANTERS.

Specification forming part of Letters Patent No. 179,723, dated July 11, 1876; application filed March 21, 1876.

*To all whom it may concern:*

Be it known that I, HENRY S. O'NEAL, of Concord, in the county of Knox and State of Tennessee, have invented a new and useful Improvement in Seed-Planter, of which the following is a specification:

Figure 1 is a top view of my improved seed-planter. Fig. 2 is a side view of the same, partly in section, to show the construction.

Similar letters of reference indicate corresponding parts.

The object of this invention is to furnish an improved planter for planting cotton, corn, pease, and other seeds, which shall be simple in construction and convenient in use, and which shall be so constructed as to enable the planting to be done in perfect check-row without previously marking the land.

The invention will first be described in connection with drawing, and then pointed out in the claim.

A represents the beam, the forward part of which is slotted to receive the upper part of the wheel B. The journals of the wheel B revolve in bearings in the bars C, the ends of which are bent upward, and are slotted to receive the bolts by which they are secured to the plow-beam A, so that they may be adjusted as may be required. The rear ends of the bars C project above the beam A, and to their upper ends are pivoted the ends of a short shaft, D, which is provided with two arms, $d^1$ $d^2$, in opposite directions. To the lower arm $d^1$ is pivoted the rear end of a rod, E, which passes forward along the side of the upper part of the wheel B, and its forward end slides in a guide-hole in the upper end of a bar, F, the lower end of which is slotted to receive the bolt by which it is secured to the beam A, so that it can be adjusted to correspond with the adjustment of the wheel B. Upon the lower side of the rod or bar E is formed, or to it is attached, a shoulder or projection, $e'$, to catch upon a pin or projection, $b'$, attached to the sides of the rim or spokes of the wheel B. Several holes are formed in the wheel B to receive the pins $b'$, to enable the machine to be adjusted to drop the seeds closer together or farther apart, as may be desired. To the ends of the arms $d^1$ $d^2$ are pivoted the forward ends of two rods, G H, the rear ends of which are attached to the forward ends of two plates, I J, which slide in slots in the lower part of the hopper K. The upper rod H is jointed so that the upper plate J may be placed at such a distance above the plate G that the space between them will contain only enough seed for a hill. The plates I J have holes formed through them for the passage of the seed, which are so arranged that the movements of the plates I J in opposite directions will bring said holes alternately into the cavity of the hopper K. With the rear end of the lower plate I is connected the end of a spring, L, the other end of which is attached to the rear part of the beam A, to draw the plate I back as soon as it is released after being drawn forward to drop the seed. As the seed escapes through the hole in the plate I it drops through a hole in the beam A, and through the conductor-spout M into the furrow opened by the plow N, which is attached to the lower end of the standard O. The upper end of the standard O is attached to the beam A, just in front of the conductor-spout M. The furrow opened by the plow N is filled and the seed is covered by the two plows P, attached to the lower ends of the standards Q. The upper ends of the standards Q are attached to the sides of the beam A, and the draft-strain upon them is sustained by the braces R attached to them, and the forward ends of which are attached to the beam A. The standards Q are slotted to receive the bolts by which they are secured to the beam A, to enable them to be adjusted to cover the seed deeper or shallower, as may be desired.

The top of the ridge, after the seed has been covered, is smoothed off by a scraper, S, secured to the lower end of the standard T by a bolt passing through a slot in the said scraper, so that it may be adjusted to correspond with the adjustment of the coverers P. The standard T is attached to the rear end of the beam A, and to its upwardly-projecting end is attached the round U, that supports the rear ends of the handles V, the forward ends of which are attached to the beam A. To the forward end of the beam A is attached a branched standard, W, to the lower ends of which are attached wings X, to push clods, lumps, stones, &c., to one side, so that they may not interfere with the proper operation of the machine. Y is the draft-hook, the rear end of which is bent downward, and is pivoted to the beam A, and to its forward part is attached a cross-bar, Z. The arms of the bar Z are bent downwardly, are slotted, and are bolted to the sides of the beam A, so that the point of draft attachment may be adjusted higher or lower, as may be desired. To one of the journals of the wheel B is attached, or upon it is formed, a crank, A', to the crank-pin of which is pivoted the forward end of the rod B'. The rod B' is made of such a length that its rear end may extend back to and rest upon the round U of the handles V, so that it may be conveniently operated by the plowman to turn the wheel B, when starting in at the end of a row, to adjust it to drop the first hill directly opposite the last hill of the preceding row, so that the field may be planted in accurate check-row.

Having thus described my invention, I claim as new and desire to secure by Letters Patent—

The combination, with the journal that operates the dropping device, of the crank A', and the rod B', arranged substantially as and for the purpose specified.

HENRY STANFORD O'NEAL.

Witnesses:
JAMES R. JONES,
WARHAM EASLEY.